US012586810B2

(12) United States Patent
Kang

(10) Patent No.: US 12,586,810 B2
(45) Date of Patent: Mar. 24, 2026

(54) PRESSURE JIG OF BATTERY CELL AND GAS REMOVAL METHOD USING THE SAME

(71) Applicant: LG Energy Solution, Ltd., Seoul (KR)

(72) Inventor: Byung Kwun Kang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 526 days.

(21) Appl. No.: 18/039,438

(22) PCT Filed: Nov. 2, 2022

(86) PCT No.: PCT/KR2022/017068
§ 371 (c)(1),
(2) Date: May 30, 2023

(87) PCT Pub. No.: WO2023/080648
PCT Pub. Date: May 11, 2023

(65) Prior Publication Data
US 2023/0420724 A1 Dec. 28, 2023

(30) Foreign Application Priority Data
Nov. 4, 2021 (KR) ........................ 10-2021-0150241

(51) Int. Cl.
*H01M 10/04* (2006.01)
*H01M 50/342* (2021.01)
(52) U.S. Cl.
CPC ... *H01M 10/0468* (2013.01); *H01M 50/3425* (2021.01)
(58) Field of Classification Search
CPC ......... H01M 10/0468; H01M 10/0481; H01M 50/3425; H01M 50/30
See application file for complete search history.

(56) References Cited

U.S. PATENT DOCUMENTS

2017/0317376 A1 11/2017 Yoon et al.
2022/0278352 A1 9/2022 Hong et al.

FOREIGN PATENT DOCUMENTS

CN 103811817 A 5/2014
EP 3886227 A1 9/2021
JP 2021082407 A 5/2021
KR 20130044776 A 5/2013
(Continued)

OTHER PUBLICATIONS

International Search Report for Application No. PCT/KR2022/017068 mailed Feb. 14, 23. 3 pages.
(Continued)

*Primary Examiner* — Sarah A. Slifka
(74) *Attorney, Agent, or Firm* — Lerner David LLP

(57) ABSTRACT

A battery cell pressure jig of an embodiment of the present invention includes a first pressure block and a second pressure block pressurizing both sides of a battery cell with the battery cell interposed therebetween. The first pressure block and the second pressure block each includes: a flat-type pressure plate that presses the battery cell; a support plate supporting the pressure plate; hinge members provided at the upper edges of the pressure plate and the support plate so that the pressure plate and the support plate are mutually foldable; and an elastic member coupled to the lower end of either the pressure plate or the support plate. The battery cell pressure jig may sequentially press the battery cell from the lower portion to the upper portion.

13 Claims, 6 Drawing Sheets

(56) References Cited

FOREIGN PATENT DOCUMENTS

| KR | 20150089555 | A | 8/2015 |
| KR | 20160056207 | A | 5/2016 |
| KR | 101747909 | B1 | 6/2017 |
| KR | 20170096352 | A | 8/2017 |
| KR | 20180131004 | A | 12/2018 |
| KR | 20190072289 | A | 6/2019 |
| KR | 20210090459 | A | 7/2021 |

OTHER PUBLICATIONS

Extended European Search Report including Written Opinion for Application No. 22890379.5 dated Jun. 17, 2024, pp. 1-8.

[FIG. 1]
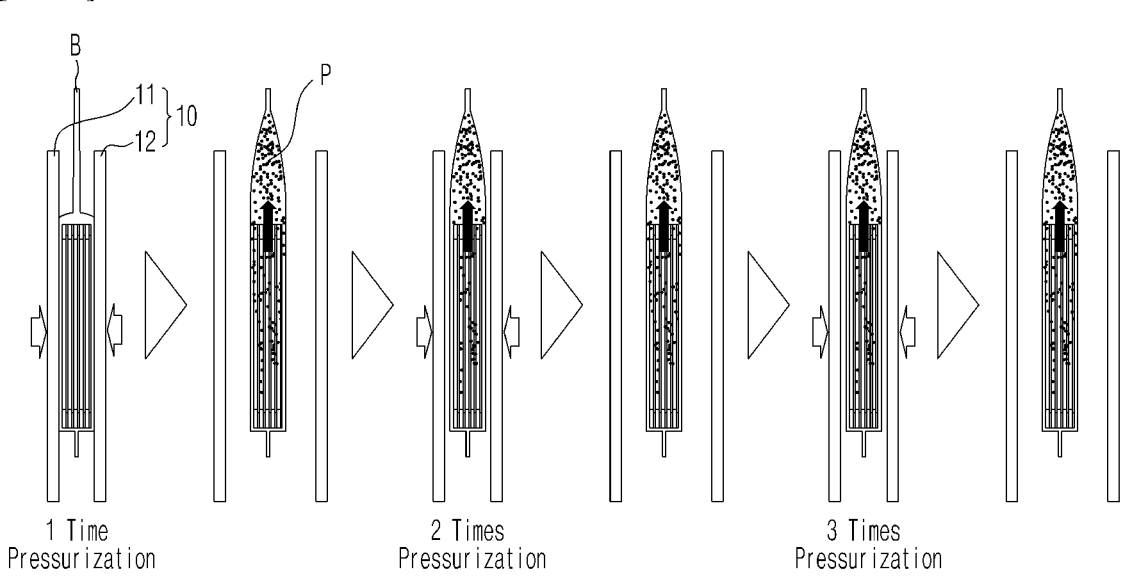
1 Time
Pressurization
2 Times
Pressurization
3 Times
Pressurization
Prior Art
[FIG. 2]
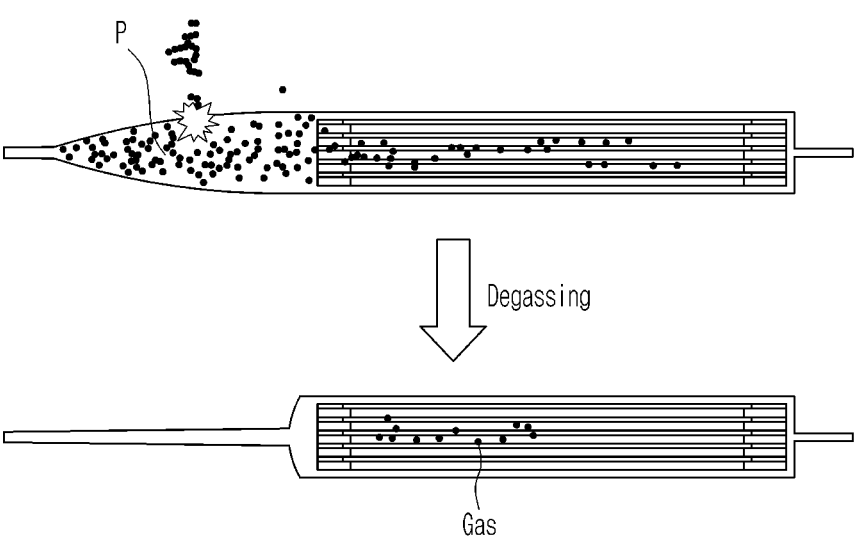
Degassing
Gas
Prior Art

[FIG. 3A]
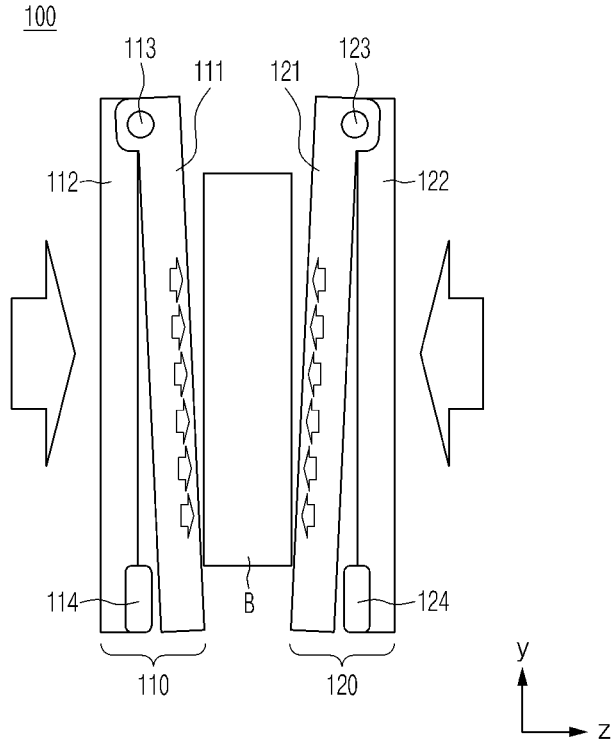
[FIG. 3B]
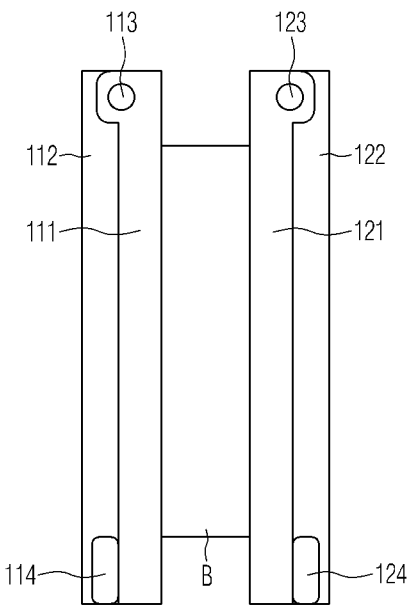
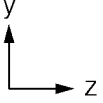

[FIG. 4]
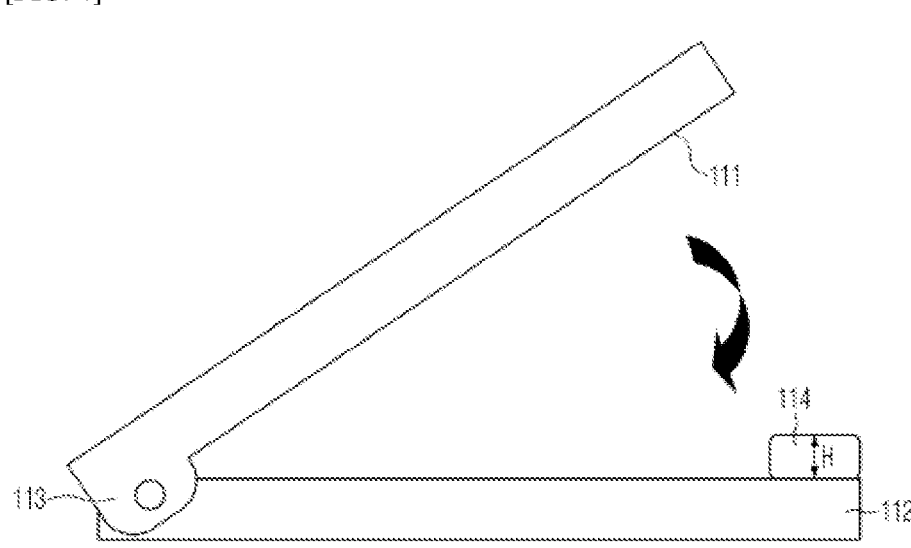
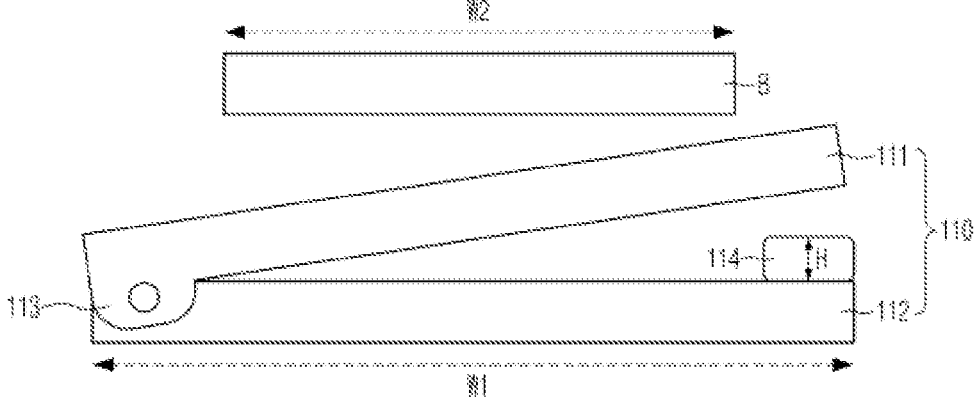

[FIG. 5]
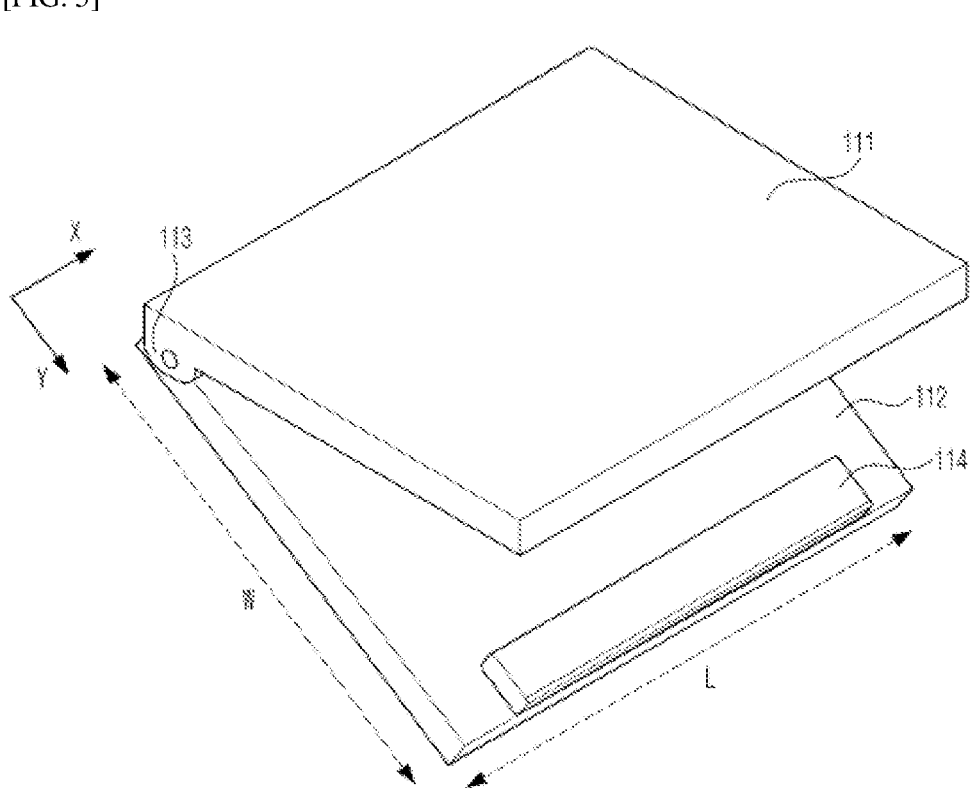
[FIG. 6]
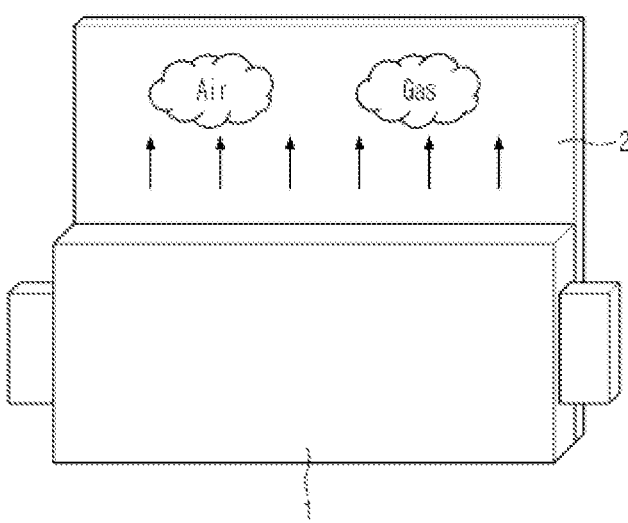

[FIG. 7]
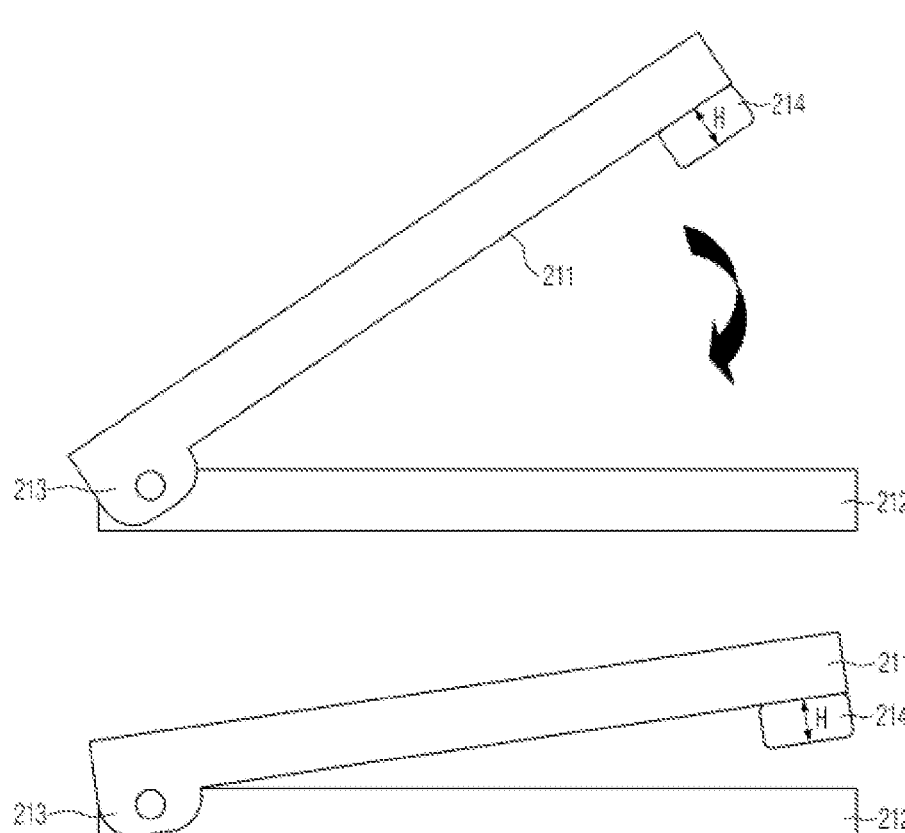

[FIG. 8]
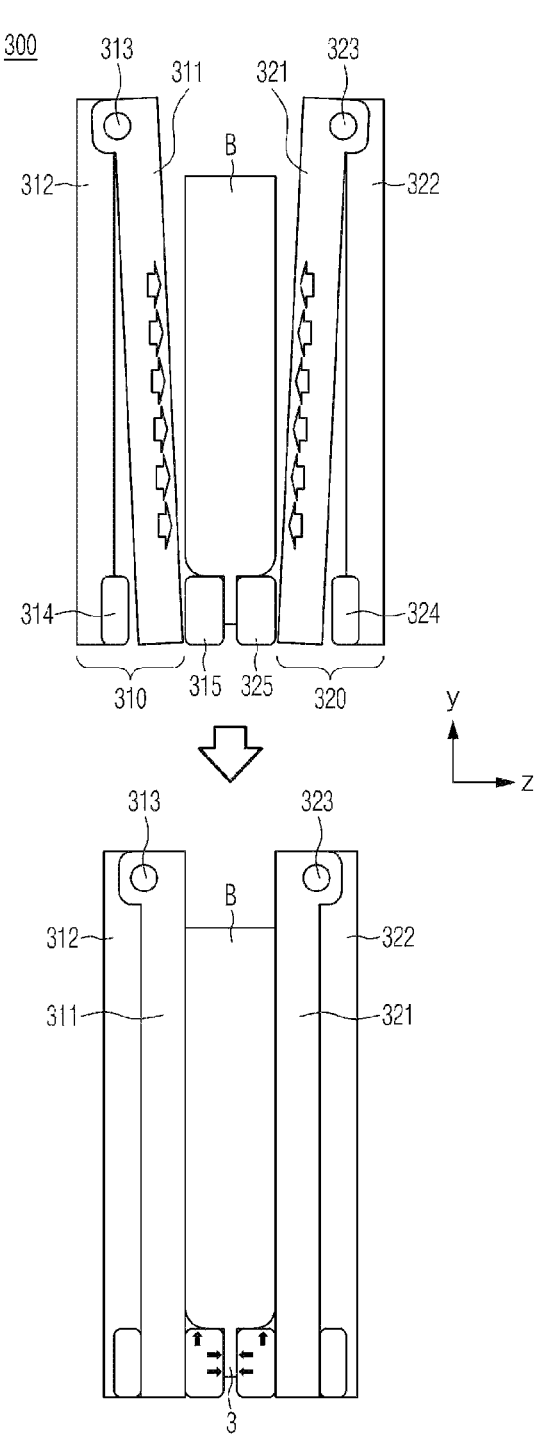

PRESSURE JIG OF BATTERY CELL AND GAS REMOVAL METHOD USING THE SAME

CROSS-REFERENCE TO RELATED APPLICATIONS

The present application is a national phase entry under 35 U.S.C § 371 of International Application No. PCT/KR2022/017068 filed on Nov. 2, 2022, which claims the benefit of priority based on Korean Patent Application No. 10-2021-0150241, filed on Nov. 4, 2021, all contents of which are incorporated herein by reference.

TECHNICAL FIELD

The present disclosure relates to a pressure jig of a battery cell and a method for removing residual gas inside a battery cell using the same.

BACKGROUND TECHNOLOGY OF THE INVENTION

Generally, secondary batteries can be classified into cylindrical, prismatic, pouch-type, etc. depending on its shape. Among them, the pouch-type secondary battery, because its exterior is made up of exterior materials that is composed of a metal layer(foil) and a synthetic resin multilayer that is coated on the lower and upper surface of the metal layer, allows significantly reducing the weight of the battery compared to a cylindrical or a prismatic battery which uses a metal can. A pouch-type battery is also drawing a lot of attention by having an advantage of being able to change into diverse forms.

Such pouch-type secondary battery is stored with an electrode assembly in a layered form. The electrode assembly is connected with an electrode tab and an electrode lead, and the electrode lead is protruded from the pouch exterior material. Such electrode lead is supplied with electric power from an external device by being electrically connected to the external device.

A pouch-type secondary battery is manufactured through a process of assembling the cell and activating the battery. In the battery activation process, the secondary battery cell is loaded to an apparatus for charging and discharging, then the charging-discharging is carried out under necessary conditions for a battery activation. As such, the process of carrying out charging-discharging using the apparatus for charging and discharging for the battery activation is called a formation process.

In addition, during the formation process, both sides of the battery cell may be pressed using a means of pressurization such as a jig including a flat-type pressure plate during activation charging, which is also referred to as a jig formation. This jig formation prevents the expansion of a negative electrode during the activation process, induces gas generation by promoting chemical reaction of the battery, and moves the internal gas to a gas pocket part.

FIG. 1 illustrates a conventional press jig for pressurizing a battery during the formation process, and FIG. 2 illustrates problems that may arise when the formation process is performed using the conventional press jig. Referring to FIG. 1, a conventional press jig 10 may include multiple pressure plates, and it is configured to press both surfaces of a battery cell in a state where the battery cell B is interposed between the pressure plate 11 and the other pressure plate 12. The pressurization by the pressure jig may be repeated 2 to 3 times, and the gas generated during the formation process moves to the gas pocket part P at the upper part of the battery cell by the jig pressurization. Then, as shown in FIG. 2, a degassing process is performed in which a hole is drilled in the gas pocket and a vacuum is applied in order to discharge the internal gas collected in the gas pocket to the outside of the pouch.

However, even after going through the pressing and the degassing processes by the pressure jig, some gas may remain in a negative electrode, between the negative electrode and a separation membrane, between a positive electrode and the separation membrane, and in the positive electrode. This is because the pressure plate that presses the battery cell has a flat shape and presses the entire surface of the battery cell at once, making it difficult for gas to move. Therefore, it is necessary to develop a technology for a new pressing means and a gas discharging method for reducing the amount of gas remaining inside the battery cell.

DESCRIPTION OF THE INVENTION

Technical Problem

The present disclosure has been made to solve the above problems, and it is directed to provide a pressing means and a gas removal method having a novel structure in which the gas inside is easily moved to a gas pocket when a battery cell is pressurized.

Technical Solution

A battery cell pressure jig includes: a first pressure block and a second pressure block pressurizing both sides of a battery cell with the battery cell interposed therebetween, and the first pressure block and the second pressure block each includes: a flat-type pressure plate that faces and presses the battery cell; a support plate supporting the pressure plate when the pressure plate presses the battery cell; hinge members provided at the upper edges of the pressure plate and the support plate so that the pressure plate and the support plate are mutually foldable; and an elastic member coupled to the lower end of either the pressure plate or the support plate, and is compressed when the battery cell is pressed.

The pressure jig according to one exemplary embodiment of the present invention is configured to press the battery cell in a state in which the pressure plate and the support plate are mutually folded.

In one exemplary embodiment of the present invention, an elastic member is coupled to the upper surface of the lower edge portion of the support plate.

In one exemplary embodiment of the present invention, the elastic member is coupled to the lower surface of the lower edge portion of the pressure plate.

In one exemplary embodiment of the present invention, the elastic member may be an elastic spring or a memory foam, preferably a memory foam.

In one exemplary embodiment of the present invention, the elastic member is attached to either the pressure plate or the support plate by an adhesive material or a double-sided tape.

In one exemplary embodiment of the present invention, the full width of each of the pressure plate and the support plate is longer than the full width of the battery cell.

In one exemplary embodiment of the present invention, the full width of each of the pressure plate and the support plate is 110% to 200% of the full width of the battery cell.

The pressure jig according to one exemplary embodiment of the present invention further includes a guide member for guiding the battery cells to be aligned, and the guide member is interposed between the lower edge of the pressure plate and the lower portion of the battery cell.

In one exemplary embodiment of the present invention, the guide member is an elastic spring or a memory foam.

In one exemplary embodiment of the present invention, the pressure plate has a built-in heating coil.

The battery cell degassing method according to an embodiment of the present invention includes: a pressurization process of pressing the battery cell using the battery cell pressure jig of claim 1; and an exhaust process of discharging the gas inside the battery cell to the outside.

Advantageous Effects

The battery cell pressure jig of an embodiment of the present invention has the elastic member provided at the lower edge of the support plate for supporting the pressure plate, and as pressure is sequentially applied to the battery cell from the lower portion to the upper portion of the battery cell, it is easy for the gas to move into the gas pocket part of the upper portion with directionality, thereby having an effect of suppressing the gas trap phenomenon in which gas is trapped inside the electrode assembly.

Since the degassing method of an embodiment of the present invention degasses gas after moving the internal gas to the gas pocket part using the pressure jig, it is possible to minimize gas remaining inside the battery cell.

BRIEF DESCRIPTION OF THE DRAWINGS

FIG. 1 is a schematic diagram of a conventional battery cell pressure jig.

FIG. 2 is a conceptual diagram illustrating problems that may arise when as formation process is performed using a conventional battery cell pressure jig.

FIGS. 3A and 3B are a schematic diagrams illustrating a structure and two different operating states of a battery cell pressure jig according to an exemplary embodiment of the present invention.

FIG. 4 is a schematic diagram of a first pressure block in two different operating states according to an exemplary embodiment of the present invention.

FIG. 5 is a perspective view of a first pressure block according to an exemplary embodiment of the present invention.

FIG. 6 is a schematic diagram of a battery cell pressurized by the pressure jig of an embodiment of the present invention.

FIG. 7 is a schematic diagram of a first pressure block in two different operating states according to another exemplary embodiment of the present invention.

FIG. 8 is a schematic diagram illustrating a structure and two different operating states of a battery cell pressure jig according to another exemplary embodiment of the present invention.

REFERENCE NUMERALS

B: BATTERY CELL
100, 200, 300: PRESSURE JIG
110, 310: FIRST PRESSURE BLOCK
120, 320: SECOND PRESSURE BLOCK
111, 121, 211, 221, 311, 321: PRESSURE PLATE
112, 122, 212, 222, 312, 322: SUPPORT PLATE 113, 123, 213, 223, 313, 323: HINGE MEMBER
114, 124, 214, 224, 314, 324: ELASTIC MEMBER
315, 325: GUIDE MEMBER
1: ELECTRODE ASSEMBLY ACCOMMODATING PART
2: GAS POCKET PART
3: SEALING SURPLUS PART

DETAILED DESCRIPTION

The present technology may have various modifications and various examples, thereby specific examples are illustrated in the drawings and described in detail in the detailed description. However, it should be understood that the present invention is not limited to specific embodiments, and includes all modifications, equivalents or alternatives within the spirit and technical scope of the present invention.

The terms "comprise," "include" and "have" used herein to designate the presence of characteristics, numbers, steps, actions, components, or members described in the specification or a combination thereof, and it should be understood that the possibility of the presence or addition of one or more other characteristics, numbers, steps, actions, components, members or a combination thereof is not excluded in advance. In addition, when a part of a layer, a film, a region or a plate is disposed "on" another part, this includes not only a case in which one part is disposed "directly on" another part, but a case in which a third part is interposed therebetween. In contrast, when a part of a layer, a film, a region or a plate is disposed "under" another part, this includes not only a case in which one part is disposed "directly under" another part, but a case in which a third part is interposed therebetween. In addition, in this application, "on" may include not only a case of disposed on an upper part but also a case of disposed on a lower part.

A Battery Cell Pressure Jig According to the First Exemplary Embodiment

FIGS. 3A-B are a schematic diagrams illustrating a structure and two different operating states of a battery cell pressure jig according to an exemplary embodiment of the present invention, with FIG. 3A showing a press release state and FIG. 3B showing a press application state, and FIG. 4 is a schematic diagram of a first pressure block in two different operating states.

Referring to FIGS. 3A-B and FIG. 4, the battery cell pressure jig 100 according to an embodiment of the present invention includes a first pressure block 110 and a second pressure block 120 pressing both sides of the battery cell with the battery cell B interposed therebetween, Each of the first pressure block 110 and the second pressure block 120 includes: flat-type pressure plates 111, 121 that pressurize the battery cell by being in face-to-face contact;

Support plates 112, 122 that support the pressure plates 111, 121 when the pressure plates 111, 121 press the battery cell B;

Hinge members 113, 123 provided at each upper edge portion of the pressure plates 111, 121 and the support plates 112, 122 so that the pressure plate and the support plates are mutually foldable; and Elastic members 114, 124 coupled to the lower end of either the pressure plates 111, 121 or the support plates 112, 122, and are compressed when the battery cell B is pressed.

Here, the upper part of the pressure plates and the support plates refers to a part corresponding to the gas pocket part, which is the upper part of the battery cell, and the lower part of the pressure plates and the support plates refers to a part corresponding to the part where the electrode assembly is accommodated, which is the lower part of the battery cell.

In the pressure jig 100 having such a structure, since the elastic members 114, 124 are coupled to the lower part of the pressure plates 111, 121 or the support plates 112, 122, in the pressure release state, the space between the lower part of the pressure plates 111, 121 and the lower part of the support plates 112, 122 is spaced apart at least the height H of the elastic members 114, 124.

Meanwhile, since the pressure plates 111, 121 and the support plates 112, 122 are each provided with hinger members 113, 123 at their upper edge portions and these (the pressure plates and the support plates) are coupled by the hinge members, there is almost no separation between the upper part of the pressure plates and the upper part of the support plates.

Therefore, as shown in FIG. 3A, in the pressure release state, the separation distance between the pressure plates 111, 121 and the support plates 112, 122 gradually increases from the upper part to the lower part (y-axis direction). And the separation distance between the pressure plates 111, 121 and the battery cell B gradually decreases from the upper part to the lower part (y-axis direction).

Accordingly, when the pressure plates 111, 121 press the battery cell B, it is possible to sequentially press the battery cell B from the lower part of the battery cell B that is relatively close to the pressure plates 111, 121 toward the upper part of the battery cell B that is relatively far from the pressure plates 111, 121.

As described above, since the battery cell pressure jig 1000 of an embodiment of the present invention can pressurize the battery cell from the lower part toward the upper part of the battery cell, it is easy for the gas to move to the gas pocket part of the upper part during pressurization, and accordingly, there is an effect of effectively preventing the gas trap phenomenon.

The pressure jig 1000 of an embodiment of the present invention has a structure in which the first pressure block 110 and the second pressure block 120 facing each other in pairs press both sides of the battery cell B interposed therebetween. The structures of the first pressure block 110 and the second pressure block 120 are the same, and there is only a difference in that the regions where they press the battery cell face each other.

Since the first pressure block 110 and the second pressure block 120 have the same structure, the pressure block will be described based on the first pressure block. Referring to FIG. 4, the pressure block 110 is hinged by a hinge member 113 such that the two plates 111, 112 are mutually foldable. The pressure plate 111 presses the battery cell by directly facing any one surface of the battery cell B, and the support plate 112 absorbs the reaction force when the pressure plate 111 presses the battery cell B.

In addition, a hinge member 113 is provided at the upper edge portion of the pressure plate 111 and the support plate 112. By the hinge member 113, the pressure plate 111 and the support plate 112 are hinged to each other to be mutually foldable. And in a state in which the pressure plate 111 and the support plate 112 are mutually folded, it is configured to pressurize the battery cell B located between the first pressure block 110 and the second pressure block 120.

The pressure plate 111 may be a flat-type and made of a strong material to pressurize the battery cell B. Specifically, the pressure plate 111 may be a metal material, and among them, it may be made of an aluminum material. However, it is not limited thereto, and may be made of a heat-resistant and hard plastic material.

Meanwhile, when it is necessary to pressurize the battery cell B at a high temperature, a heating coil (not shown) may be built into the pressure plate 111 to heat the pressure plate 111. In this case, the pressure plate 111 is preferably a material having an excellent thermal conductivity.

The support plate 112 serves to support the pressure plate 111, its shape may be a flat-type, which is the same as that of the pressure plate 111, and its size may be the same as the pressure plate 111 or slightly larger than the pressure plate 111. The material of the support plate 112 may be made of a material that supports the pressure plate 111 so that the pressure plate 111 can press the battery cell B well and has sufficient rigidity to withstand the reaction force during pressurization. A typical example of such a material is a metal material, and specifically, an aluminum material. However, it is not limited thereto, and it may be made of a plastic material.

In one specific example, the elastic member 114 may be coupled to an upper surface of a lower edge portion of the support plate 112. Here, the upper surface means one surface facing the pressure plate 111 among both surfaces of the support plate 112.

When the pressure plate 111 is folded toward the support plate 112 by having the elastic member 114 coupled to the upper surface of the lower part of the support plate 112, the bottom lower surface of the pressure plate 111 can be in face-to-face contact with the elastic member 114. Here, the lower surface of the pressure plate 111 means one surface facing the support 112 among both surfaces of the pressure plate 111.

Here, when no force is applied, the lower part of the pressure plate 111 may be located at a distance apart from the lower part of the support plate 112 at least by the height H of the elastic member 114.

In a state where the battery cell B is not pressurized as such, there is a gap between the lower part of the pressure plate 111 and the lower part of the support plate 112, and the upper part of the pressure plate 111 is coupled to the support plate 112, so the pressure plate 111 is tilted with respect to the support plate 112.

When the battery cell B is pressed in this state, the elastic member 114 absorbs the reaction force generated during battery cell pressurization, and is compressed as shown in the FIG. 3B. In addition, as the elastic member 114 is compressed, the separation between the lower part of the pressure plate 111 and the lower part of the support plate 112 gradually becomes closer, and the pressure plate 111, which has been tilted with respect to the support plate 112, gradually becomes parallel to the support plate 112. Accordingly, the pressure plate 111 can sequentially press from the lower part of the battery cell B to the upper part of the battery cell B.

Meanwhile, FIGS. 3A-B and FIG. 4 illustrate examples in which the elastic member 114 is coupled to the bottom upper surface of the support plate 112, but as shown in FIG. 7, the elastic member may be coupled to the bottom lower surface of the pressure plate 111.

Referring to FIG. 7, the first pressure block 210 includes a flat-type pressure plate 211 that faces and presses the battery cell; a support plate 212 supporting the pressure plate 211 when the pressure plate 211 presses the battery cell, a hinge member 213 provided at the upper edges of the pressure plate 211 and the support plate 212 so that the pressure plate 211 and the support plate 212 are mutually foldable; and an elastic member 214 coupled to the lower end of the pressure plate 211, and is compressed when the battery cell is pressed.

The elastic members 114, 124 may be an elastic spring or a memory foam, and compared to the elastic spring, the memory foam can be more easily coupled to the pressure plate 111 or the support plate 212, and the memory foam is more preferable in that it has an excellent ability to absorb the reaction force generated during battery cell B pressurization. As long as the material has an excellent elastic restoring force, the material of the memory foam is not limited, and specifically, it may be a polyurethane-based material.

The elastic members 114, 214 may be attached and coupled to the pressure plate 111 or the support plate 212 by an adhesive material or a double-sided tape.

FIG. 5 is a perspective view of a pressure block 110 according to an exemplary embodiment of the present invention, and referring to FIG. 5, the elastic member is a memory foam, has a bar shape, and a thin elastic member extends along the longitudinal direction (x-axis direction) of the support plate.

The height H of the elastic member may be set to an appropriate height depending on the material, the modulus of elasticity, and the pressing force of the battery cell, and specifically, it may be 1 to 30 mm, 3 to 20 mm, and 5 to 10 mm, but is not limited thereto.

In addition, in the case where the elastic member is a memory foam, the width thereof may be 3 to 50 mm, 5 to 30 mm, and 15 to 25 mm, but is not limited thereto.

In one specific example, the full width W1 of each of the pressure plate and the support plate may be greater than the full width W2 of the battery cell.

Here, referring to FIG. 4 and FIG. 5, the full width refers to a length corresponding to the full width W2 of the battery cell indicated by W1, and the full width of the battery cell refers to a length indicated by W2, and specifically, it is the width of the battery cell in the direction (y-axis direction) from the region where the electrode assembly is accommodated to the gas pocket part.

The entire surface of the battery cell B can be stably pressed when the full width W1 of each of the pressure plate 111 and the support plate 112 is longer than the full width W2 of the battery cell B. In a specific example, each full width W1 of the pressure plate and the support plate may be 110% to 200%, 115% to 180%, and 120% to 150% of the full width W2 of the battery cell.

The battery cell pressure jig according to an embodiment of the present invention can sequentially press from the lower part to the upper part of the battery cell, and as shown in FIG. 6, gas generated during the formation process or bubbles in the electrolyte can be easily moved from the electrode assembly 1 to the gas pocket part 2, so that it can suppress the bubbles or the gas from being trapped inside the electrode assembly.

A Battery Cell Pressure Jig According to the Second Exemplary Embodiment

FIG. 8 is a schematic diagram of a battery cell pressure jig in two different operating states according to the second exemplary embodiment of the present invention. Referring to FIG. 8, the battery cell pressure jig 300 according to the second exemplary embodiment includes a first pressure block 310 and a second pressure block 320 that press both sides of the battery cell with the battery cell interposed therebetween.

The first and second pressure blocks 310, 320 respectively include,

Flat-type pressure plates 311, 321 that presses the battery cell B by being in face-to-face contact;

Support plates 312, 322 supporting the pressure plates 311, 321 when the pressure plates 311, 321 press the battery cell;

Hinge members 313, 323 provided at the upper edge portions of the pressure plates 311, 321 and the support plates 312, 322 so that the pressure plates 311, 321 and the support plates 312, 322 are mutually foldable;

Elastic members 314, 324 coupled to the lower part of either the pressure plate 311, 321 or the support plates 312, 322, and are compressed when the battery cell is pressed; and Guide members 315, 325 that guide the battery cell B to be in an alignment.

The guide members 315, 325 are interposed between the lower edges of the pressure plates 311, 321 and the lower part of the battery cell.

Referring to FIG. 8, the guide members 315, 325 face the elastic members 314, 324 with the pressure plates 311, 321 interposed therebetween. That is, the elastic members 314, 324 and the guide members 315, 325 have a structure that can face each other with the pressure plates 311, 321 interposed therebetween.

The guide members 315, 325, like the elastic members 314, 324, may be elastic springs or memory foams, preferably memory foams. Compared to the elastic spring, the memory foam can be more easily coupled to the pressure plates 311, 321, and it is more preferable in that it has an excellent ability to absorb the reaction force generated during battery cell B pressurization. The memory foam has no limit in its material as long as it is a material with an excellent elastic restoring force, and specifically, it may be a polyurethane-based material.

The guide members 315, 325 may be coupled to the upper surfaces of the lower edges of the pressure plates 311, 321, or may be simply interposed between the lower edges of the pressure plates 311, 321 and the lower part of the battery cell B. In this case, the guide members 315, 325 are interposed between the pressure plate 311 and the battery cell B to be in close contact with the sealing surplus part 3 in the battery cell lower part.

The pressure jig 300 of an embodiment of the present invention presses the battery cell B in a state where the battery cell B is interposed between the first pressure block 310 and the second pressure block 320, and in the lower part of the battery cell B, there is a sealing surplus part 3. The sealing surplus part 3 is a part where two layers of pouch sheets are sealed and is thinner than the part where electrode assembly is accommodated, so that a step occurs on a boundary between the electrode assembly accommodating part and the sealing surplus part.

When the battery cell B is inserted between the first pressure block 310 and the second pressure block 320 to pressurize the battery cell, the guide members 315, 325 serve to guide the battery cell B to be in the correct position so that the electrode assembly accommodating part of a stepped battery cell B does not go down any further than the guide members 315, 325.

In addition, the guide members 315, 325 also have an effect of buffering the sealing surplus part and its surroundings during pressurization. As the pressure plates 311, 321 pressurize the battery cell B, most of the internal gas may move toward the gas pocket part of the upper part of the battery cell, but some of the internal gas may move to the sealing surplus part 3 in the lower part.

Meanwhile, the sealing surplus part 3 is a pan where two layers of pouch sheets are fuse-bonded and sealed, and micropores may exist inside the sealing surplus part, and if gas suddenly flows into the micropores, the sealing surplus part 3 cannot overcome the pressure of the flowing gas, so the pouch of the sealing surplus part 3 may be partially damaged. However, if the guide members 315, 325 are in close contact with the sealing surplus part 3, even if some of the internal gas tries to flow into the sealing surplus part 3 due to pressurization of the battery cell, it is difficult for the internal gas to flow into the sealing surplus part 3 since the guide members 315, 325 apply an external force to the sealing surplus part 3, allowing the gas to move to the electrode assembly accommodating part. Therefore, it is possible to prevent damage to the pouch due to a sudden inflow of gas into the sealing surplus part 3. In addition, the gas that may remain around the sealing surplus sealing part 3 can also move upward due to the compressive stress generated when the guide member is compressed, thereby further maximizing the effect of an embodiment of the present invention.

The battery cell pressure jig according to the second exemplary embodiment is only different from the first exemplary embodiment in that it further includes a guide member, and since the rest of the technical details are the same, further detailed description will be omitted.

Battery Cell Degassing Method

In addition, an embodiment of the present invention provides a degassing method capable of sequentially pressurizing the battery cell from the lower part to the upper part of the battery cell using such a pressure jig.

A battery cell, to which the pressure jig and the degassing method of an embodiment of the present invention is applied, is manufactured by accommodating an electrode assembly having a positive electrode/separation membrane/negative electrode structure in a battery case, injecting an electrolyte, and sealing the battery cell.

Specifically, an electrode mixture containing an electrode active material and a binder is applied to an electrode current collector to prepare a positive electrode and a negative electrode, respectively, and then an electrode assembly is prepared by interposing a separation membrane between the positive electrode and the negative electrode.

After accommodating the prepared electrode assembly in the battery case, electrolyte is injected, and the battery case is sealed to assemble the battery.

A step of assembling such a battery is not particularly limited and can be performed according to a known method.

In addition, the electrode assembly is not particularly limited as long as it has a structure including a positive electrode, a negative electrode and a separation membrane interposed between the positive electrode and the negative electrode, and may be, for example, a jelly-roll type, a stack type, or a stack/fold type.

Here, the battery case is not particularly limited as long as it is used as an exterior material for packaging the battery, and a cylindrical, a prismatic, or a pouch type may be used, but in detail, a pouch type battery case may be used. The pouch type battery case is usually made of an aluminum laminate sheet, and may be composed of an inner sealant layer for sealing, a metal layer for preventing penetration of substances, and an outer resin layer forming the outermost part of the case. The battery cell is manufactured by heat-sealing the upper case and the lower case in a state in which the electrode lead is drawn out after the electrode assembly is accommodated in the pouch-type battery case, and a heat-sealing part may be formed at the end of the battery case. Hereinafter, detailed descriptions of the battery case are omitted because they are known to those skilled in the art.

The positive electrode includes a positive electrode current collector and a positive electrode active material layer prepared by applying, drying, and pressing a positive electrode mixture slurry on the positive electrode current collector. The positive electrode mixture includes a positive electrode active material and a binder, and, if necessary, may further include a positive electrode additive, a conductive material, and a filler.

The positive electrode active material is a compound capable of reversible intercalation and deintercalation of lithium, and specifically, may include a lithium composite metal oxide containing lithium and one or more metals such as cobalt, manganese, nickel, or aluminum. More specifically, the lithium composite metal oxide is a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-y}Mn_yO_2$ (where $0<Y<1$), $LiMn_{2-z}Ni_zO_4$ (where $0<Z<2$, etc.), a lithium-nickel-cobalt-based oxide (e.g., $LiNi_{1-y1}Co_{y1}O_2$ (where $0<Y1<1$, etc.), a lithium-manganese-cobalt-based oxide (e.g., $LiCo_{1-y2}Mn_{y2}O_2$ (where $0<Y2<1$), $LiMn_{2-z1}Co_{z1}O_4$ (where $0<Z1<2$, etc.), a lithium-nickel-manganese-cobalt-based oxide (e.g., $Li(Ni_pCo_qMn_{r1})O_2$ (where $0<p<1$, $0<q<1$, $0<r1<1$, $p+q+r1=1$) or $Li(Ni_{p1}Co_{q1}Mn_{r2})O_4$ (where $0<p1<2$, $0<q1<2$, $0<r2<2$, $p1+q1+r2=2$), etc.), or a lithium-nickel-cobalt-transition metal (M) oxide (e.g., $Li(Ni_{p2}Co_{q2}Mn_{r3}M_{s2})O_2$ (where M is selected from the group consisting of Al, Fe, V, Cr, Ti, Ta, Mg. and Mo, and p2, q2, r3, and s2 are atomic fractions of independent elements where $0<p2<1$, $0<q2<1$, $0<r3<1$, $0<s2<1$, $p2+2+r3+s2=1$, respectively), etc.), and the like, and any one or two or more of these compounds may be included. Among them, in a sense that it can improve the capacity characteristics and stability of the battery, the lithium composite metal oxide may be $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$, etc.), or lithium nickel cobalt aluminum oxide (e.g., $Li(Ni_{0.8}Co_{0.15}Al_{0.05})O_2$, etc.). A remarkably improved effect may occur by controlling the type and content ratio of constituent elements forming the lithium composite metal oxide, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$ or $Li(Ni_{0.8}Mn_{0.1}Co_{0.1})O_2$, etc., and anyone of these or a mixture of two or more may be used.

In addition, the content of the positive electrode active material may be 85 to 99 parts by weight, specifically 88 to 98 parts by weight, 90 to 97 parts by weight, or 92 to 95 parts by weight with respect to 100 parts by weight of the positive electrode mixture.

The conductive material may be used to improve performance such as electrical conductivity of the positive electrode, and may use one or more selected from the group consisting of natural graphite, artificial graphite, carbon black, acetylene black, ketjen black, and carbon fiber. For example, the conductive material may include acetylene black.

In addition, the conductive material may be included in an amount of 1 to 10 parts by weight, specifically 2 to 8 parts by weight; or 2 to 6 parts by weight with respect to 100 parts by weight of the mixture layer.

In addition, the binder may include one or more resin selected from the group consisting of polyvinylidene fluoride-hexafluoropropylene copolymer (PVDF-co-HFP), polyvinylidene fluoride, polyacrylonitrile, polymethylmethacrylate, and copolymers thereof. As an example, the binder may include polyvinylidene fluoride.

In addition, the binder may be included in an amount of 1 to 10 parts by weight, specifically 1 to 8 parts by weight; or 1 to 6 parts by weight with respect to 100 parts by weight of the total mixture.

Furthermore, the average thickness of the mixture layer is not particularly limited, but may be specifically 50 µm to 300 µm, more specifically 100 µm to 200 µm; 80 µm to 150 µm; 120 µm to 170 µm; 150 µm to 300 µm; 200 µm to 300 µm; or may be 150 µm to 190 µm.

In addition, the positive electrode may be used as a current collector that has a high conductivity without causing chemical change in the battery. For example, stainless steel, aluminum, nickel, titanium, calcined carbon, etc. may be used, and in the case of aluminum or stainless steel, those whose surfaces are treated with carbon, nickel, titanium, silver, or the like may be used. In addition, the current collector may form micro-scaled irregularities on the surface to increase the adhesive strength of the positive electrode active material, and various forms such as films, sheets, foils, nets, porous materials, foams, and nonwoven fabrics are possible. Additionally, the average thickness of the current collector may be in the range of 3 to 500 µm in consideration of the conductivity and the total thickness of the positive electrode to be manufactured.

Moreover, the negative electrode of the lithium secondary battery used in an embodiment of the present invention is prepared by applying, drying, and pressing the negative electrode active material on the negative electrode current collector, and, if necessary, the same conductive material, organic binder polymer, additives, etc. as in the positive electrode may be optionally further included.

In addition, as the negative electrode active material, for example, graphite having a completely layered crystal structure such as natural graphite, soft carbon having a low crystalline layered crystal structure (graphene structure; a structure in which hexagonal honeycomb-shaped planes of carbon are arranged in layers), and carbon and graphite materials such as hard carbon, artificial graphite, expanded graphite, carbon fiber, non-graphitizable carbon, carbon black, carbon nanotube, fullerene, and activated carbon in which these structures are mixed with amorphous parts; metal composite oxides such as $LixFe_2O_3$ ($0 \leq x \leq 1$), $LixWO_2$ ($0 \leq x \leq 1$), $SnxMe1-xMe'yOz$ (Me: Mn, Fe, Pb, Ge; Me', Al, B, P, Si, elements of groups 1, 2, and 3 of the periodic table, halogens; $0 < x \leq 1$; $1 \leq y \leq 3$; $1 \leq z \leq 8$), and etc.; lithium metals, lithium alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-based materials; titanium oxides; lithium titanium oxides, and the like can be used.

As an example, the negative electrode may include both graphite and silicon (Si)-containing particles, and the graphite may include any one or more of natural graphite having a layered crystal structure and artificial graphite having an isotropic structure, and the silicon (Si)-containing particles are particles containing silicon (Si) as a main component as a metal component, which may include silicon (Si) particles, SiO particles, $SiO_2$ particles, or a mixture of one or more of these particles.

In this case, the negative electrode active material may include 80 to 95 parts by weight of graphite; and 1 to 20 parts by weight of silicon (Si)-containing particles with respect to 100 parts by weight of the total. The present technology may improve the charge capacity per unit mass while reducing lithium consumption and irreversible capacity loss during the initial charge and discharge of the battery by adjusting the content of graphite and silicon (Si)-containing particles included in the negative electrode active material within the above ranges.

In addition, the negative electrode mixture layer may have an average thickness of 100 µm to 200 µm, specifically 100 µm to 180 µm, 100 µm to 150 µm, 120 µm to 200 µm, 140 µm to 200 µm, or 140 µm to 160 µm.

Moreover, the negative electrode current collector is not particularly limited as long as it has a high conductivity without causing chemical change in the battery, and for example, copper, stainless steel, nickel, titanium, baked carbon, etc. can be used, and in the case of copper or stainless steel, those whose surfaces are treated with carbon, nickel, titanium, silver, or the like may be used. In addition, like the positive electrode current collector, the negative electrode current collector may form micro-scaled irregularities on the surface to increase the adhesive strength of the positive electrode active material, and various forms such as films, sheets, foils, nets, porous materials, foams, and nonwoven fabrics are possible. In addition, the average thickness of the negative electrode current collector may be appropriately applied in the range of 3 to 500 µm in consideration of the conductivity and total thickness of the negative electrode to be manufactured.

In addition, the separation membrane is interposed between the positive electrode and the negative electrode, and an insulating thin film having a high ion permeability and a high mechanical strength is used. The separation membrane is not particularly limited as long as it is commonly used in the art, but specifically, a chemically resistant and hydrophobic polypropylene; a glass fiber; or a sheet or a non-woven fabric made of polyethylene may be used, and in some cases, a composite separation membrane in which inorganic particles/organic particles are coated with an organic binder polymer may be used on a porous polymer substrate such as the sheet or the non-woven fabric. When a solid electrolyte such as a polymer is used as the electrolyte, the solid electrolyte may serve as the separation membrane. In addition, the average pore diameter of the separation membrane is 0.01 to 10 µm, and the average thickness is 5 to 300 µm.

The electrolyte may include an organic solvent, a lithium salt, and an additive.

The organic solvent is not limited as long as decomposition due to an oxidation reaction or the like can be minimized during the charging and discharging process of the battery, and for example, it may be a cyclic carbonate, a linear carbonate, an ester, an ether, or a ketone, etc. These may be used alone, or two or more may be used in combination.

Among the above organic solvents, carbonate-based organic solvents may be preferably used, and examples of cyclic carbonates include ethylene carbonate (EC), propylene carbonate (PC), and butylene carbonate (BC), and representative examples of linear carbonates include dimethyl carbonate (DMC), diethyl carbonate (DEC), dipropyl carbonate (DPC), ethyl methyl carbonate (EMC), methyl propyl carbonate (MPC), and ethyl propyl carbonate (EPC).

For the lithium salt, lithium salts commonly used in electrolytes of lithium secondary batteries such as $LiPF_6$, $LiAsF_6$, $LiCF_3SO_3$, $LiN(CF_3SO_2)_2$, $LiBF_4$, $LiBF_6$, $LiSbF_6$, $LiN(C_2FsSO_2)_2$, $LiAlO_4$, $LiAlCl_4$, $LiSO_3CF_3$, and $LiClO_4$ may be used without limitation, and these may be used alone, or two or more may be used in combination.

In addition, the electrolyte further includes an additive, for example, as the additive, in order to stably form an SEI film, any one selected from the group consisting of vinyl ethylene carbonate, fluoroethylene carbonate, cyclic sulfite, saturated sultone, unsaturated sultone, acyclic sulfone, lithium oxalyl difluoroborate (LiODFB), and derivatives thereof, or a mixture of two or more thereof may be used, but is not limited thereto.

The battery cell degassing method according to an embodiment of the present invention includes a process of pressurizing the battery cell using the above-described battery cell pressure jig and a process of discharging the gas inside the battery cell to the outside.

The process of pressurizing the battery cell may be performed once, or may be repeated 2 to 5 times. Since the pressurization method according to an embodiment of the present invention uses the above-described pressure jig, when pressurizing the battery cell, it is possible to pressurize sequentially from the lower part of the battery cell to the upper part direction where the gas pocket part is located, and thus the gas generated during the formation process may move from the lower part toward the upper part where the gas pocket part is located with directionality.

Then, the gas inside the battery cell is discharged through a subsequent gas discharge process. In this gas discharge process, various techniques known at the filing time of the present disclosure may be employed. For example, in a pouch-type secondary battery with one side extended, the degassing process may be performed by cutting the extended part and sealing the part that is cut, or a process of discharging internal gas to the outside may be performed in a vacuum by forming a through-hole in the gas pocket part. However, since this degassing technique is widely known to those skilled in the art, a detailed description thereof will be omitted.

As above, the exemplary embodiments of the present invention have been described with reference to diagrams, but it should be understood by those skilled in the art or those of ordinary skill in the art that the present invention can be variously modified and changed without departing from the spirit and technical scope of the present invention described in the accompanying claims.

Therefore, the technical scope of the present invention is not limited to the contents described in the detailed description of the specification, but should be defined by the claims.

The invention claimed is:

1. A battery cell pressure jig, comprising:
a first pressure block and a second pressure block configured to apply pressure to both sides of a battery cell when the battery cell is interposed between the first and the second pressure block, and
wherein the first pressure block and the second pressure block each comprise:
a pressure plate oriented so as to face the battery cell and being configured to press the battery cell, wherein the pressure plate is a flat-type pressure plate;

a support plate supporting the pressure plate;
hinge members joining the pressure plate and the support plate, so that the pressure plate and the support plate are mutually foldable; and
an elastic member coupled to the pressure plate or the support plate, so as to be compressed when the battery cell is pressed.

2. The battery cell pressure jig of claim 1, wherein the jig is configured to press the battery cell in a state in which the pressure plate and the support plate are mutually folded.

3. The battery cell pressure jig of claim 1, wherein the elastic member is coupled to the support plate, the elastic member being disposed on a side of the support plate opposite the hinged member, wherein the elastic member is disposed between the support plate and the pressure plate.

4. The battery cell pressure jig of claim 1, wherein the elastic member is coupled to the pressure plate, the elastic member being disposed on a side of the pressure plate opposite the hinged member, wherein the elastic member is disposed between the support plate and the pressure plate.

5. The battery cell pressure jig of claim 1, wherein the elastic member is an elastic spring or a memory foam.

6. The battery cell pressure jig of claim 1, wherein the elastic member is a memory foam.

7. The battery cell pressure jig of claim 1, wherein the elastic member is attached to either the pressure plate or the support plate by an adhesive material or a double-sided tape.

8. The battery cell pressure jig of claim 1, wherein a full width of each of the pressure plate and the support plate is greater than a full width of the battery cell.

9. The battery cell pressure jig of claim 1, wherein a full width of each of the pressure plate and the support plate is ranges from 110% to 200% of a full width of the battery cell.

10. The battery cell pressure jig of claim 1, further comprising:
a guide member configured to align the battery cell, wherein the guide member is interposed between the pressure plate and the battery cell, wherein the guide member is coupled to the pressure plate on a side of the pressure plate opposite the hinged member.

11. The battery cell pressure jig of claim 10, wherein the guide member is an elastic spring or a memory foam.

12. The battery cell pressure jig of claim 1, wherein the pressure plate has a built-in heating coil.

13. A battery cell degassing method, comprising:
pressurizing the battery cell using the battery cell pressure jig of claim 1 by pressing the battery cell in a pressurization process; and
discharging a gas inside the battery cell to the outside by an exhaust process.

* * * * *